US010023246B2

(12) United States Patent
Ito et al.

(10) Patent No.: US 10,023,246 B2
(45) Date of Patent: Jul. 17, 2018

(54) PRESS-FORMED PRODUCT, AUTOMOBILE STRUCTURAL MEMBER INCLUDING THE SAME, PRODUCTION METHOD AND PRODUCTION DEVICE FOR THE PRESS-FORMED PRODUCT

(71) Applicant: NIPPON STEEL & SUMITOMO METAL CORPORATION, Tokyo (JP)

(72) Inventors: Yasuhiro Ito, Amagasaki (JP); Yoshiaki Nakazawa, Takarazuka (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 36 days.

(21) Appl. No.: 15/301,734

(22) PCT Filed: Mar. 20, 2015

(86) PCT No.: PCT/JP2015/001561
§ 371 (c)(1),
(2) Date: Oct. 4, 2016

(87) PCT Pub. No.: WO2015/155943
PCT Pub. Date: Oct. 15, 2015

(65) Prior Publication Data
US 2017/0021870 A1    Jan. 26, 2017

(30) Foreign Application Priority Data

Apr. 9, 2014  (JP) .................. 2014-080448

(51) Int. Cl.
*B60N 99/00*    (2006.01)
*B62D 29/00*    (2006.01)
(Continued)

(52) U.S. Cl.
CPC ........... *B62D 29/007* (2013.01); *B21D 19/08* (2013.01); *B21D 22/02* (2013.01); *B21D 22/26* (2013.01); *B21D 47/00* (2013.01); *B21D 53/88* (2013.01)

(58) Field of Classification Search
CPC ....... B62D 29/007; B21D 19/08; B21D 22/02; B21D 22/26; B21D 47/00; B21D 53/88
See application file for complete search history.

(56) References Cited

U.S. PATENT DOCUMENTS

2004/0253503 A1* 12/2004 Ohtani .................... C22C 38/02
                                                            429/509
2010/0218375 A1*  9/2010 Saito ..................... B21D 5/015
                                                            29/897.2
2013/0263637 A1* 10/2013 Yamano ................. B21D 22/20
                                                            72/348

FOREIGN PATENT DOCUMENTS

CN    101434243    5/2009
CN    101574720    11/2009
(Continued)

*Primary Examiner* — Lori L Lyjak
(74) *Attorney, Agent, or Firm* — Clark & Brody

(57) ABSTRACT

A bulkhead, which is a press-formed product, includes a top plate part, side flange parts and corner flange parts. The side flange parts each extend from respective sides of the top plate part. The corner flange parts each extend from respective corner parts of the top plate part. The corner flange part connects the side flange parts to each other. In the corner flange part, a part having a minimum value of plate thickness is present in a central portion in a circumferential direction, and parts having a maximum value of the plate thickness are present on both sides thereof. A ratio of the maximum value and the minimum value is in a range of more than 1.0 to 1.6 or less.

12 Claims, 11 Drawing Sheets

(51) Int. Cl.
*B21D 19/08* (2006.01)
*B21D 53/88* (2006.01)
*B21D 22/02* (2006.01)
*B21D 47/00* (2006.01)
*B21D 22/26* (2006.01)

(56) References Cited

FOREIGN PATENT DOCUMENTS

| | | |
|---|---|---|
| JP | 04-118118 | 4/1992 |
| JP | 07-112219 | 5/1995 |
| JP | 08-90076 | 4/1996 |
| JP | 2554768 | 11/1996 |
| JP | 2560416 | 12/1996 |

* cited by examiner

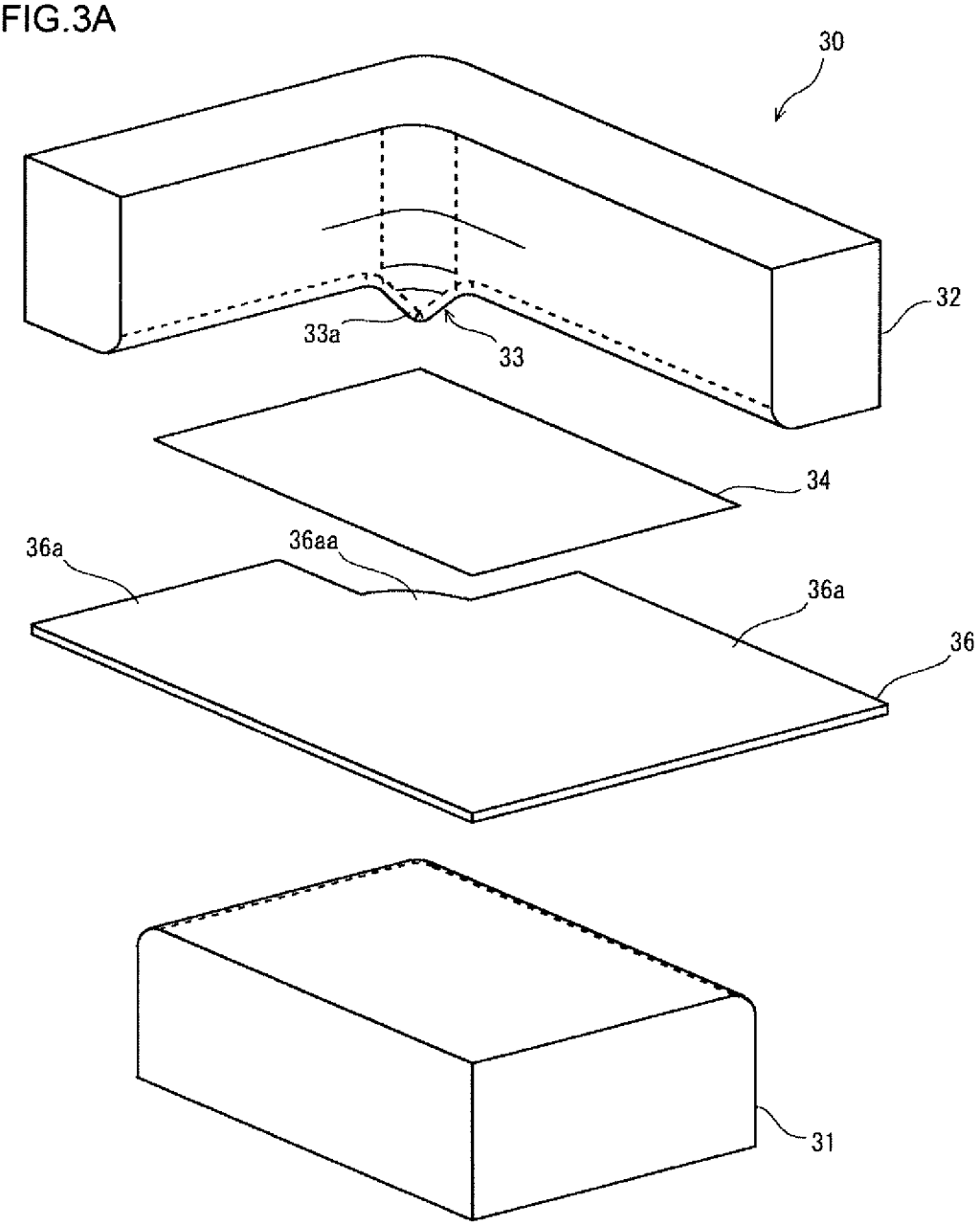

PRESS-FORMED PRODUCT, AUTOMOBILE STRUCTURAL MEMBER INCLUDING THE SAME, PRODUCTION METHOD AND PRODUCTION DEVICE FOR THE PRESS-FORMED PRODUCT

TECHNICAL FIELD

The present invention relates to a press-formed product of a steel plate, and particularly relates to a press-formed product suitable as a reinforcing member for a structural member constituting an automobile body. Further, the present invention relates to an automobile structural member including the press-formed product, and a production method and a production device for the press-formed product.

BACKGROUND ART

An automobile body includes various structural members (for example, a rocker (also referred to as a side sill), a cross member, a side member, a center pillar, and the like). For the structural members, press-formed products of steel plates are frequently used. The press-formed products for use in the structural members have channel-shaped or hat-shaped sectional shapes, for example. A press-formed product having a channel-shaped section includes a top plate part and a pair of flange parts connecting to the top plate part. A press-formed product having a hat-shaped section includes a top plate part, a pair of vertical wall parts connecting to the top plate part, and a pair of flange parts connecting to the respective vertical wall parts. In general, mutual edge portions of a plurality of press-formed products are laid on one another, and are joined by resistance spot welding. In this way, a hollow structural member is assembled.

In an automobile structural member as above, reinforcing members are joined by resistance spot welding to important parts such as those where the formed products are joined to each other, and those where high loads are applied. For the reinforcing members, press-formed products of steel plates are frequently used. In the case of a rocker, for example, reinforcing members that partition an inside of the rocker are disposed at one spot or a plurality of spots in a lengthwise direction of the rocker. This is for ensuring three-point bending crush performance of the rocker with respect to the load of a lateral collision. The reinforcing member is referred to as a bulkhead or a stiffener.

FIG. 1 is a perspective view showing an example of a rocker including a conventional bulkhead inside. FIG. 1 shows a state in which a bulkhead 110 inside is seen through. In the following explanation, the case where the structural member is a rocker 1 is taken as an example.

As shown in FIG. 1, the rocker 1 is a long hollow cylindrical body. A sectional shape of the rocker 1 illustrated in FIG. 1 is substantially rectangular. The bulkhead 110 includes a top plate part 111 and flange parts 114. An outline shape of the top plate part 111 substantially corresponds to an inner sectional shape of the rocker 1. The flange parts 114 are formed at respective four sides 112 of the top plate part 111. The bulkhead 110 is disposed in a predetermined position in a lengthwise direction in the inside of the rocker 1. The respective flange parts 114 of the bulkhead 110 are overlaid on inner surfaces of the rocker 1, and are joined to the rocker 1 by resistance spot welding or the like. From the viewpoint of reducing the weight of an automobile body, press-formed products formed from a high-tensile strength steel plate are used for the rocker 1 and the bulkhead 110.

Tensile strength of the high-tensile strength steel plate in this case is usually set at 440 MPa or more, and is sometimes set to be more than 440 MPa in accordance with required performance or the like.

Conventionally, the flange parts 114 have been formed by individually folding respective edge parts of the four sides 112 of the top plate part 111. Hereinafter, the individual flange parts 114 which extend from the respective sides 112 of the top plate part 111 will also be referred to as "side flange parts". In this case, the flange parts 114 are separated to be discontinuous at corner parts 113 that connect the adjacent sides 112 of the top plate part 111. In some cases, cutouts 117 are provided at both side ends of each of the side flange parts 114, as shown in FIG. 1.

Speaking from a performance aspect of the bulkhead 110 (the reinforcing member) in the rocker 1 (the automobile structural member), it is more desirable that the flange parts are configured as follows, than the flange parts 114 are discontinued in the corner parts 113 of the top plate part 111 as in the conventional bulkhead 110 shown in FIG. 1, from an idealistic viewpoint. The flange parts also extend from the respective corner parts 113 of the top plate part 111. Hereinafter, the individual flange parts which extend from the respective corner parts 113 of the top plate part 111 will also be referred to as "corner flange parts". The adjacent side flange parts are connected via the corner flange part. In this case, the flange parts continue from the certain side 112 of the top plate part 111 throughout the corner parts 113 and the adjacent sides 112. Hereinafter, the flange part that continues without being separated in the corner part 113 of the top plate part 111 will also be referred to a "continuous flange part".

However, it is very difficult to obtain the product including the continuous flange part by press forming. It has been, of course, conventionally possible to obtain a product such as a lid of a can by press-forming a soft plate material of soft steel, aluminum or the like. However, it is difficult to produce a product including the continuous flange part by especially press-forming a high-tensile strength steel plate, in order to obtain a reinforcing member in the automobile structural member described above. This is for the following reason.

When producing the product including a continuous flange part from a steel plate by press forming, forming of the corner flange part is shrink-flanging. Consequently, wrinkles easily occur in the corner flange parts. The wrinkles occur more remarkably as strength of the steel plate is higher.

When wrinkles occur in the corner flange part, the following problem arises. Referring to the example shown in FIG. 1, when the bulkhead 110 is disposed inside the rocker 1 and mutual overlapping portions are joined by resistance spot welding, gaps due to wrinkles are generated in the overlapping portions. Thereby, a trouble such as poor welding easily occurs. Further, position of the bulkhead 110 in the rocker 1 easily becomes unstable. Accordingly, if wrinkles occur in the corner flange parts of the bulkhead 110, the bulkhead 110 cannot be used as an actual product.

Prior arts that suppress occurrence of wrinkles in the regions to be shrink-flanged at the time of press-forming steel plates are as follows.

For example, Japanese Patent No. 2554768 (Patent Literature 1) and Japanese Patent Application Publication No. 07-112219 (Patent Literature 2) each disclose a technique of forming a roof panel having an opening for a sunroof. Each of the techniques of Patent Literatures 1 and 2 indicates that in order to absorb an excess line length of the region to be shrink-flanged at a time of forming, an excess thickness part is given in advance. Japanese Patent No. 2560416 (Patent Literature 3) discloses a technique of square cylinder draw forming. In the technique of Patent Literature 3, a specific shape is given to a region to be shrink-flanged. Japanese Patent Application Publication No. 04-118118 (Patent Literature 4) discloses a technique of press forming using a cam structure. It is indicated that in the technique of Patent Literature 4, forming is performed while presser bar pressure is given to a region to be shrink-flanged.

CITATION LIST

Patent Literature

Patent Literature 1: Japanese Patent No. 2554768
Patent Literature 2: Japanese Patent Application Publication No. 07-112219
Patent Literature 3: Japanese Patent No. 2560416
Patent Literature 4: Japanese Patent Application Publication No. 04-118118

SUMMARY OF INVENTION

Technical Problem

In development of automobiles, higher functionality and higher value addition of structural members are always studied, and study on enhancement of three-point bending crush performance of the structural members at a time of crushing is not an exception.

Therefore, an objective of the present invention is to provide a press-formed product suitable as a reinforcing member (a bulkhead) that contributes to enhancement of three-point bending crush performance of a structural member (example: a rocker or the like) at a time of a collision, for example, in particular, a press-formed product including a continuous flange part in which wrinkles are suppressed in corner flange parts. Further, another objective of the present invention is to provide an automobile structural member that includes the press-formed product as a reinforcing member, and is excellent in three-point bending crush performance.

In each of the aforementioned techniques of Patent Literatures 1 to 3, the excess line length to be the cause of wrinkles and excessive thickness at the time of press forming is absorbed by the excess thickness part which is given in advance. The excess thickness part remains in the product after press forming. Consequently, not only the excess thickness part becomes a hindrance to resistance spot welding in a domain of the excess thickness part, but also the excess thickness part sometimes becomes a hindrance to resistance spot welding in other domains.

In the aforementioned technique of Patent Literature 4, a shrinkage degree and a reaction force received by a cam structure are small when a product having a region with a large radius of curvature (2100 mm, for example) is formed. Consequently, wrinkles can be suppressed in the region with a large radius of curvature. However, when a product having a region with a small radius of curvature (5 mm, for example) is formed, a shrinkage degree and a reaction force received by a cam structure are large. Consequently, wrinkles cannot be suppressed in the region with a small radius of curvature. Especially in press-forming with use of a high-tensile strength steel plate as a blank, yield stress of the blank is high, and therefore, out-of-plane deformation of the blank under elastic deformation becomes large. Consequently, excessively large wrinkles occur. In addition, the reaction force received by the cam structure becomes excessively large, and therefore, handling is difficult with the cam structure.

As above, it is difficult to obtain a product including a continuous flange part by press forming in the prior technique. In particular, it is nearly impossible in the prior technique to press-form a high-tensile strength steel plate of 440 MPa-class or more, and produce a product with wrinkles suppressed, in order to obtain a press-formed product suitable for a reinforcing member for an automobile structural member.

Therefore, still another objective of the present invention is to provide a production method and a production device capable of producing a press-formed product which is a press-formed product including a continuous flange, and in which wrinkles are suppressed in corner flange parts.

Solution to Problem

A press-formed product according to one embodiment of the present invention is formed from a steel plate.

The press-formed product includes a top plate part and flange parts.

The flange parts each extend from some or all of sides constituting an outline of the top plate part.

A corner flange part extends from a corner part connecting, among the sides of the top plate part, at least a pair of the sides which are adjacent to each other and from which the flange parts extend.

The flange parts each extending from the pair of the sides are connected to each other via the corner flange part.

In the corner flange part, a part having a minimum value of plate thickness is present in a central portion in a direction along a circumferential direction of the corner part of the top plate part, parts having a maximum value of the plate thickness are present on both sides of the central portion, and a ratio of the maximum value and the minimum value is in a range of more than 1.0 to 1.6 or less.

In the above described press-formed product, a radius of curvature of the corner flange part is preferably 30 mm or less.

In the above described press-formed product, a width of at least a part of the flange parts is preferably 10 mm or more.

In the above described press-formed product, tensile strength of the press-formed product is preferably 440 MPa or more.

An automobile structural member according to one embodiment of the present invention is a hollow structural member constituting an automobile body.

The automobile structural member includes therein the press-formed product described above as a reinforcing member, wherein the flange parts are joined to the automobile structural member.

A production method for a press-formed product according to one embodiment of the present invention is for producing the press-formed product from a blank of a steel plate.

The press-formed product includes a top plate part, flange parts and a corner flange part.

The flange parts each extend from some or all of sides constituting an outline of the top plate part.

The corner flange part extends from a corner part connecting, among the sides of the top plate part, at least a pair of the sides which are adjacent to each other and from which the flange parts extend. The corner flange part connects the flange parts each extending from the pair of the sides, to each other.

The production method
uses a punch, a die and a convex-shaped tool that is disposed in a position corresponding to the corner flange part, with both of the die and the convex-shaped tool being paired with the punch,
folds the blank by relative movement of the die to the punch, and thereby forms the flange parts, and
folds the blank prior to the folding of the blank by the die, by relative movement of the convex-shaped tool to the punch, and thereby forms the corner flange part.

In the above described production method, the convex-shaped tool is preferably constructed integrally with or separately from the die.

In the above described production method,
the production method preferably further uses a blank holder that is paired with the die, and
performs forming of the corner flange part and the flange parts in a state where the blank is sandwiched by the die and the blank holder.

A production device for a press-formed product according to one embodiment of the present invention is for producing a press-formed product from a blank of a steel plate.

The press-formed product includes a top plate part, flange parts, and a corner flange part.

The flange parts each extend from some or all of sides constituting an outline of the top plate part.

The corner flange part extends from a corner part connecting, among the sides of the top plate part, at least a pair of the sides which are adjacent to each other and from which the flange parts extend. The corner flange part connects the flange parts each extending from the pair of the sides, to each other.

The production device includes a punch, a die and a convex-shaped tool that is disposed in a position corresponding to the corner flange part, with both of the die and the convex-shaped tool being paired with the punch.

The die folds the blank by relative movement to the punch, and thereby forms the flange parts.

The convex-shaped tool folds the blank prior to the folding of the blank by the die, by relative movement to the punch, and thereby forms the corner flange part.

In the production device,
a radius Rt [mm] of curvature of a front end of the convex-shaped tool preferably satisfies conditions of Formula (a) as follows.

$$Rt < rf \times \theta \tag{a}$$

In the Formula (a), rf indicates a radius [mm] of curvature of the corner flange part, and θ indicates an included angle [rad] of the pair of the flange parts connected by the corner flange part.

In the production device, the convex-shaped tool is preferably constructed integrally with or separately from the die.

In the production device, it is preferable to further include a blank holder that is disposed to face the die, and sandwiches the blank between the blank holder and the die.

Advantageous Effects of Invention

The press-formed product of the present invention includes a continuous flange part in which wrinkles are suppressed in the corner flange part. Consequently, the automobile structural member including the press-formed product as a reinforcing member is excellent in three-point bending crush performance. Further, according to the production method and the production device of the press-formed product of the present invention, the press-formed product in which wrinkles are suppressed in the corner flange part can be produced.

BRIEF DESCRIPTION OF DRAWINGS

FIG. 3A is a perspective view schematically showing an entire configuration of a production device for a press-formed product according to a first embodiment.

DESCRIPTION OF EMBODIMENTS

Hereinafter, embodiments of the present invention will be described with reference to the drawings.

Hereinafter, a press-formed product especially suitable for a reinforcing member (a bulkhead), and an automobile structural member including the press-formed product will be described first. Subsequently, a production method and a production device for the press-formed product will be described.

[Press-Formed Product (Bulkhead) and Automobile Structural Member]

Figure 2A:
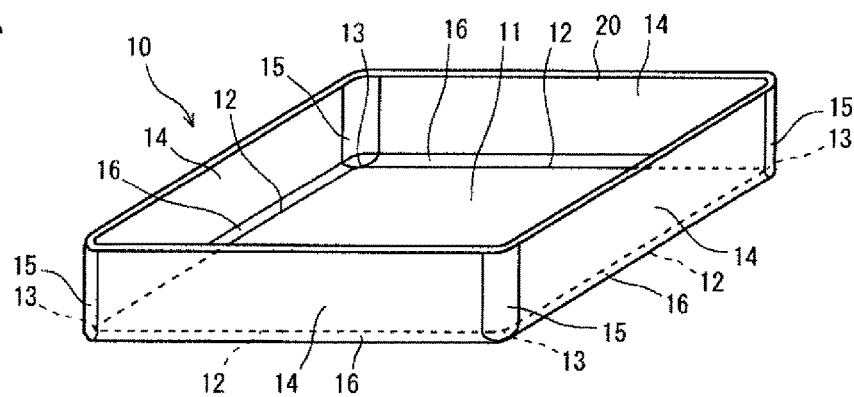
FIG. 2A is a perspective view showing a press-formed product of a first example according to the present embodiment.
Figure 2B:
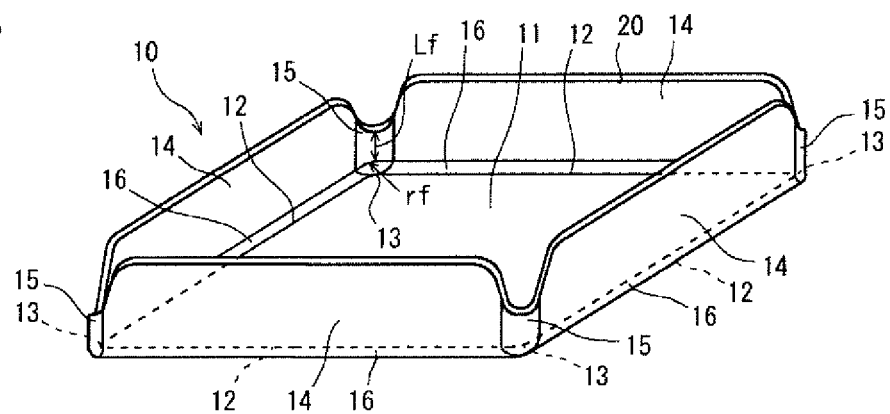
FIG. 2B is a perspective view showing a press-formed product of a second example according to the present embodiment.
Figure 2C:
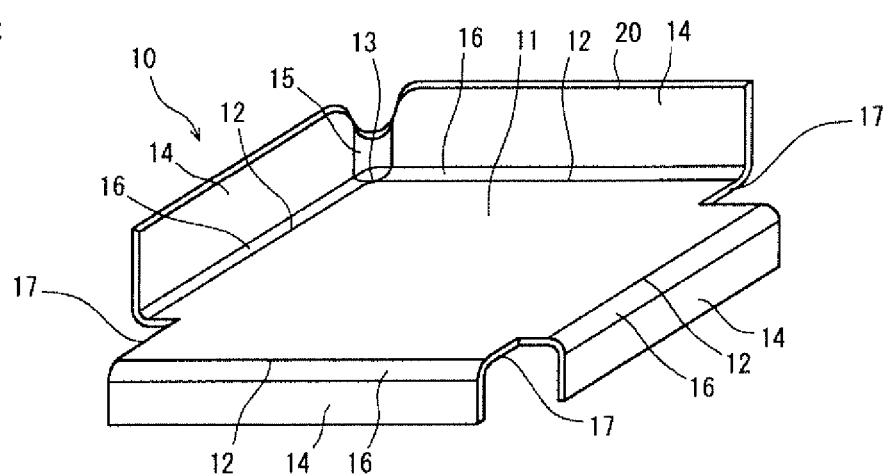
FIG. 2C is a perspective view showing a press-formed product of a third example according to the present embodiment.
Figure 2D:
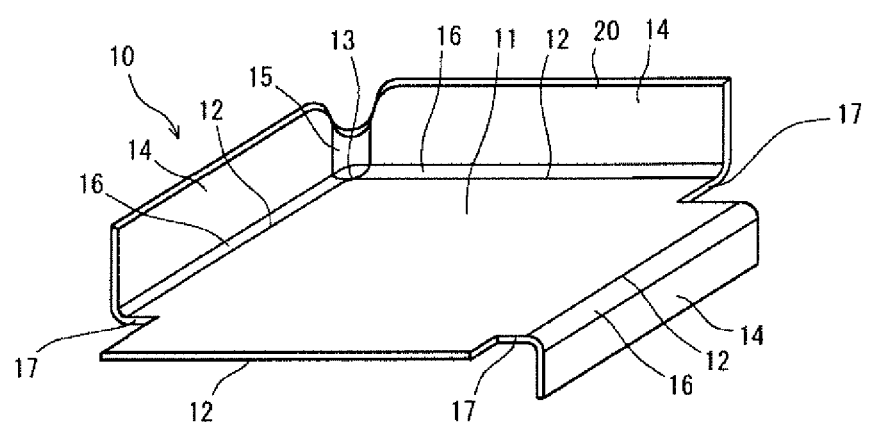
FIG. 2D is a perspective view showing a press-formed product of a fourth example according to the present embodiment.

FIG. 2A to FIG. 2D are perspective views showing typical examples of the press-formed product according to the present embodiment. Of these drawings, FIG. 2A shows a press-formed product of a first example. FIG. 2B shows a press-formed product of a second example. FIG. 2C shows a press-formed product of a third example. FIG. 2D shows a press-formed product of a fourth example. Here, a case where the press-formed product is used as a reinforcing member (bulkhead) of an automobile structural member is taken as an example.

As shown in FIG. 2A to FIG. 2D, a bulkhead 10 is a press-formed product of a steel plate. The bulkhead 10 includes a top plate part 11 and a flange part 20 connecting to the top plate part 11.

The bulkhead 10 is formed from a steel plate by press forming. Component strength of the bulkhead 10 depends on tensile strength of the steel plate. The steel plate is preferably a high-tensile strength steel plate with high tensile strength. More specifically, the tensile strength is preferably 440 MPa or more. More preferable tensile strength is 590 MPa or more, and still more preferable tensile strength is 980 MPa or more. Plate thickness of the steel plate is in a range of 0.8 to 2.0 mm.

The bulkhead 10 is included inside the automobile structural member. Examples of the structural member includes a rocker (also referred to as a side sill), a cross member, a side member, a center pillar and the like. These automobile structural members are members on which bending crush load is assumed to be applied at a time of a collision. In the case of the automobile structural member including the bulkhead 10, bending crush performance of the structural member is enhanced by the bulkhead 10.

The top plate part 11 is in a flat plate shape, and an outline shape of the top plate part is substantially rectangular. In the top plate part 11, unevenness may be formed in accordance with necessity, or a hole or the like for welding work may be formed. The outline shape of the top plate part 11 is not limited to rectangular, but can be any shape substantially corresponding to an inner sectional shape of a structural member (example: a rocker) which is an object to be joined. That is, the outline shape of the top plate part 11 may be polygonal such as triangular, pentagonal or the like, or some of sides may be in curved shapes, in accordance with the inner sectional shape of the structural member.

In the bulkhead 10 shown in FIG. 2A to FIG. 2D, the outline of the top plate part 11 is composed of four sides 12 and corner parts 13 connecting the respective adjacent sides 12. In the case of the bulkhead 10 in the first example shown in FIG. 2A, the respective corner parts 13 are curved lines each with a predetermined radius of curvature, but may be in point shapes (intersection points of the adjacent sides), for example.

[Press-Formed Product of First Example]

In the case of the bulkhead 10 of the first example shown in FIG. 2A, side flange parts 14 extend from all of the four sides 12. Further, corner flange parts 15 extend from all of the four corner parts 13. Each of the corner flange parts 15 connects the adjacent side flange parts 14. That is, the flange part 20 of the bulkhead 10 of the first example is a continuous flange part continuing throughout an entire circumference of the outline of the top plate part 11.

In the first example shown in FIG. 2A, an included angle of the top plate part 11 and each of the side flange parts 14 forms a substantially right angle, and an included angle of the top plate part 11 and each of the corner flange parts 15 also forms a substantially right angle. These included angles are not limited to the right angles, but are set at angles corresponding to an actual product shape. For example, one or more of the side flange parts 14 may form an obtuse angle or obtuse angles with the top plate part 11.

Boundaries between the top plate part 11 and the respective side flange parts 14 form ridge line parts 16. The ridge line parts 16 include the respective sides 12 of the top plate part 11, and usually have curvatures from the top plate part 11 to the respective side flange parts 14.

In regard with plate thickness of the corner flange part 15, a plate thickness distribution in a direction along a circumferential direction of the corner part 13 of the top plate part 11 is as follows. According to press-forming of the present embodiment which will be described later, an increase amount of the plate thickness in the corner flange part 15 is larger on both sides of the corner flange part 15 as compared with a central portion in the circumferential direction. Thereby, in the corner flange part 15, a part having a minimum value of the plate thickness is present in the central portion and a vicinity of the central portion in the circumferential direction, and parts each having a maximum value of the plate thickness are present on both sides of the part. Consequently, in the corner flange part 15, the plate thickness increase amount at the central portion does not increase extremely, and occurrence of wrinkles is suppressed.

In this case, a ratio (hereinafter, also referred to as a "plate thickness ratio") of the minimum value of the plate thickness at the central portion and the vicinity of the central portion of the corner flange part 15, and the maximum value of the plate thickness in both sides thereof is more than 1.0 and is 1.6 or less. In short, if the plate thickness ratio is in a range of more than 1.0 to 1.6 or less, defective forming such as wrinkles does not occur at the time of production, and the press-formed product including the continuous flange part can be obtained.

Figure 1:
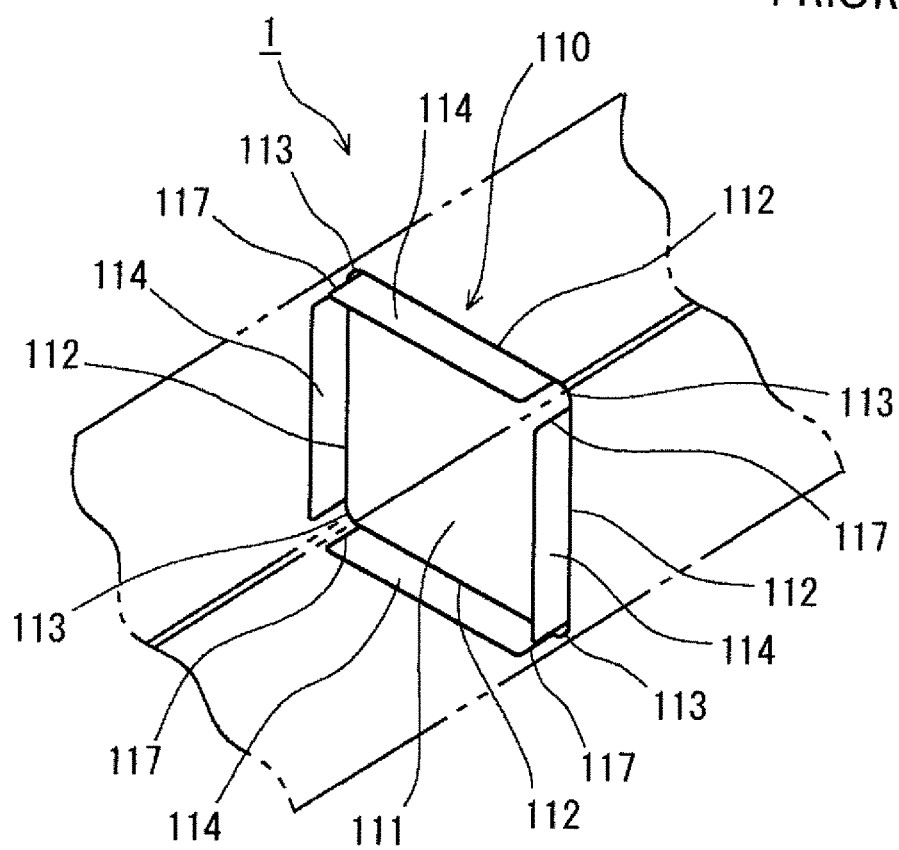
FIG. 1 is a perspective view showing an example of a rocker including a conventional bulkhead inside.

For example, when the bulkhead 10 is included in the rocker 1 (the automobile structural member) shown in FIG. 1, the bulkhead 10 is disposed in at least one spot in a lengthwise direction inside the rocker 1. A part of the flange part 20 which is overlaid on an inner surface of the rocker 1 is joined to the bulkhead 10 by resistance spot welding or the like. The bulkhead 10 may be disposed along the lengthwise direction of the rocker 1.

In order to ensure a welding domain at a time of spot welding, a width of at least a part of the flange part 20 is preferably 10 mm. In general, spot welding is applied to any of the side flange parts 14. Consequently, in a strict sense, a width of at least part of the side flange parts 14 is preferably 10 mm or more.

In the bulkhead 10 of the first example shown in FIG. 2A, a width of the flange part 20, that is, widths of the side flange parts 14 and the corner flange parts 15 are constant throughout the entire circumference of the outline of the top plate part 11. However, in accordance with necessity, parts with large widths or parts with narrow widths may coexist in the flange part 20.

A radius rf of curvature (refer to FIG. 2B) of the corner flange part 15 is preferably 30 mm or less. This is to enhance bending crush performance of the automobile structural member at the time of a collision. A more preferable radius rf of curvature is 18 mm or less, and a still more preferable radius rf of curvature is 10 mm or less.

[Press-Formed Product of Second Example]

The bulkhead 10 of a second example shown in FIG. 2B is obtained by modifying the bulkhead 10 of the first example shown in FIG. 2A. In the case of the bulkhead 10 of the second example shown in FIG. 2B, the width of each of the corner flange parts 15 is narrower than the width of the side flange part 14. More specifically, the width of each of the corner flange parts 15 becomes gradually narrower from side end portions connecting to the side flange parts 14 to a central portion. The other configuration is the same as the configuration of the first example shown in FIG. 2A.

As described above, the width of at least a part of the side flange part 14 is preferably 10 mm or more. If the width of the corner flange part 15 is large, wrinkles easily occur at the time of press-forming. Accordingly, as long as performance as the bulkhead 10 can be ensured, a configuration in which the width of the corner flange part 15 is made narrower than the width of the side flange part 14 is preferable.

In order to make formability of the corner flange part 15, and performance (example: rigidity or the like) as the bulkhead 10 compatible, a width Lf [mm] of the central portion of the corner flange part 15, and the radius rf [mm] of curvature of the corner flange part 15 preferably satisfy conditions of Formula (1) as follows.

$$0.2 \times rf \leq Lf \leq 1.2 \times rf \quad (1)$$

[Press-Formed Product of Third Example]

The bulkhead 10 of a third example shown in FIG. 2C is obtained by modifying the bulkhead 10 of the second example shown in FIG. 2B. In a case of the bulkhead 10 of the third example shown in FIG. 2C, the side flange parts 14 each extend from the two adjacent sides 12 of the four sides 12. Further, the corner flange part 15 extends from the corner part 13 which connects the respective sides 12 from which the pair of side flange parts 14 extend. The pair of side flange parts 14 and the corner flange part 15 continue by being connected to one another, and form the continuous flange part 20.

At the other two sides 12, the side flange parts 14 which are folded in an opposite direction from the continuous flange part 20 are respectively formed. Cutouts 17 that reach the top plate part 11 are provided at side end portions of the respective individual side flange parts 14 and side end portions of the continuous flange part 20. The continuous flange part 20 and the respective individual side flange parts 14 are separated from one another and are discontinuous. The other configuration is the same as the configuration of the second example shown in FIG. 2B.

That is, the bulkhead 10 of the third example shown in FIG. 2C differs from the bulkhead 10 of the second example shown in FIG. 2B, and includes the continuous flange part only throughout the one pair of adjacent sides 12. Even the bulkhead 10 of the configuration like this contributes more significantly to enhancement of the bending crush performance of the automobile structural member, as compared with a conventional bulkhead 110 shown in FIG. 1.

In short, the continuous flange part can be formed throughout at least a pair of adjacent sides, instead of being formed throughout the entire outline of the top plate part. This is because with the configuration like this, the performance is enhanced as compared with the flange part which is discontinuous in all corner parts of the top plate part. Accordingly, if the required performance is satisfied, the configuration like this may be adopted.

[Press-Formed Product of Fourth Example]

The bulkhead 10 of a fourth example shown in FIG. 2D is obtained by modifying the bulkhead 10 of the third example shown in FIG. 2C. In the case of the bulkhead 10 of the fourth example shown in FIG. 2D, the side flange part 14 is not formed at one of the two sides 12 other than the sides 12 at which the continuous flange part 20 is formed. That is, the bulkhead 10 of the fourth example shown in FIG. 2D does not have a flange part in at least one side 12 of the four sides 12 of the top plate part 11.

The bulkhead of the fourth example is applied to the case of the following conditions, for example:
the case where a certain side of the top plate part does not have to be joined to the structural member; and
the case where a surface for joining is not present in the structural member, with respect to the certain side of the top plate part.

As above, the press-formed product and the automobile structural member of the present embodiment are described with reference to FIG. 2A to FIG. 2D. As a matter of course, the press-formed product of the present embodiment is not limited to the embodiment shown in FIG. 2A to FIG. 2D. Further, a use purpose of the press-formed product is not limited to the bulkhead (reinforcing member).

[Production Method and Production Device for Press-Formed Product]

Hereinafter, explanation will be made with a case of producing the bulkhead 10 which is the press-formed product of the second example shown in FIG. 2B described above taken as an example.

[Press-Forming of First Embodiment]

Figure 3B:
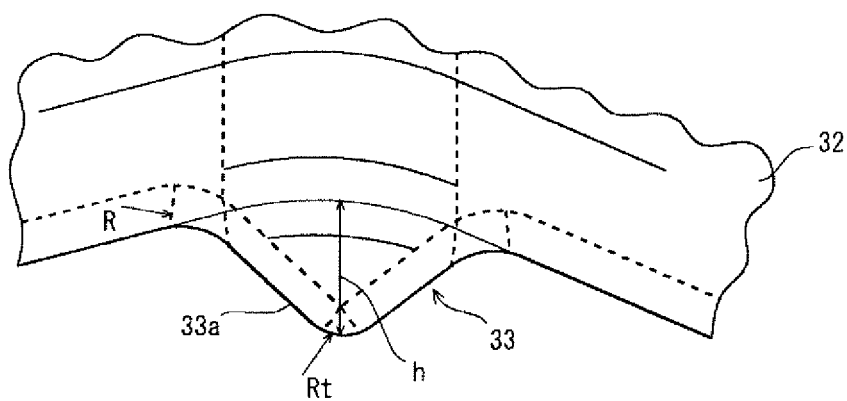
FIG. 3B is a perspective view showing a part corresponding to a convex-shaped tool in the production device by enlarging the part.
Figure 4A:
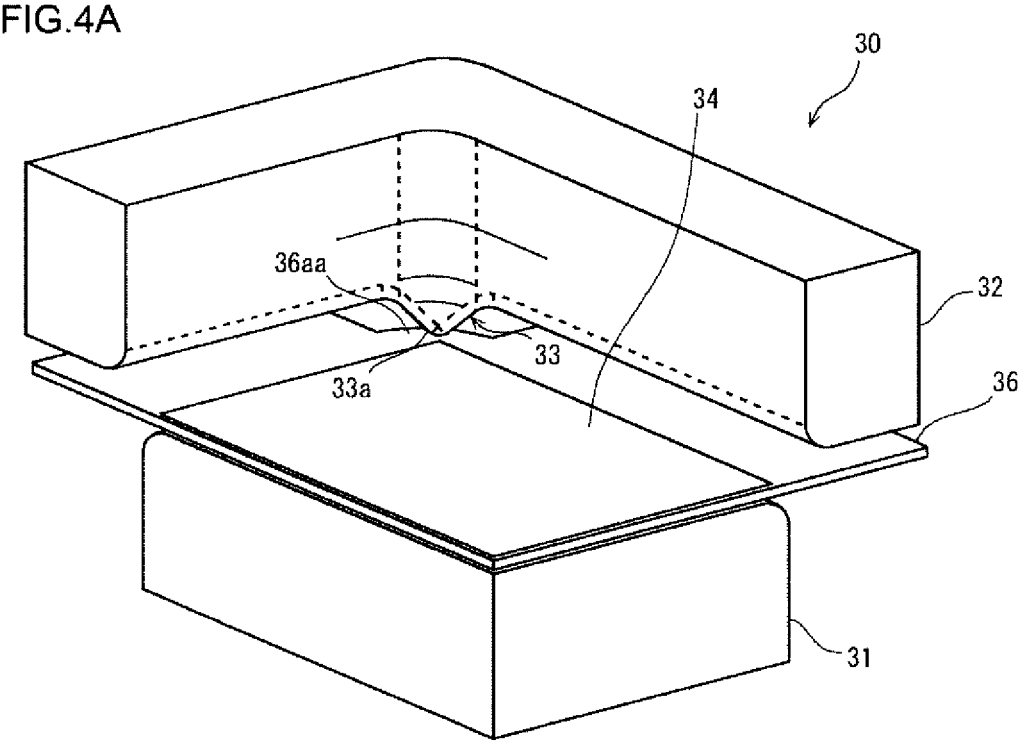
FIG. 4A is a perspective view showing a state just before the start of forming in press-forming by the production device of the first embodiment.
Figure 4B:
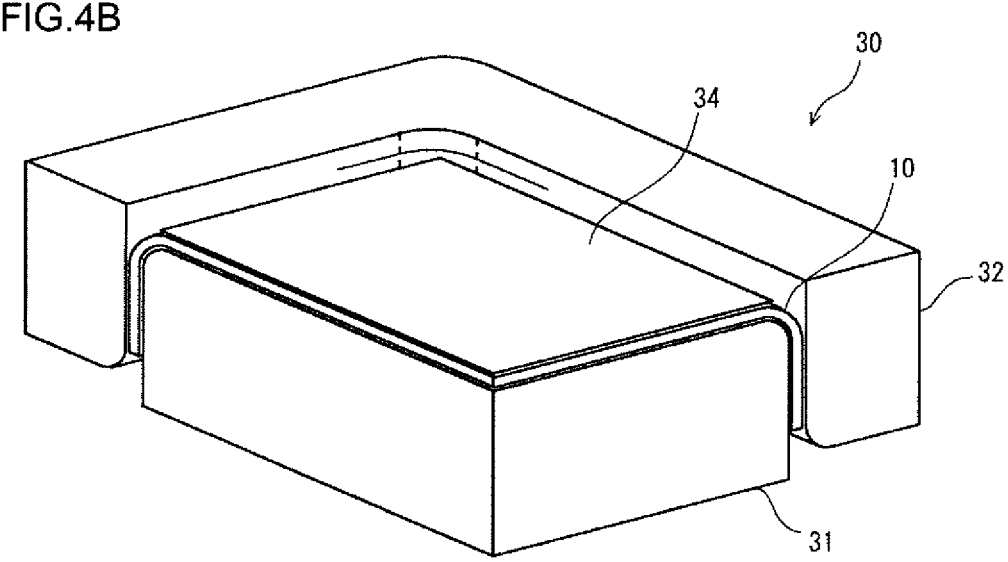
FIG. 4B is a perspective view showing a state at a time of completion of forming in the press forming by the production device of the first embodiment.

FIG. 3A is a perspective view schematically showing an entire configuration of a production device for a press-formed product according to the first embodiment. FIG. 3B is a perspective view showing a part corresponding to a convex-shaped tool in the production device by enlarging the part. FIG. 4A and FIG. 4B are perspective views showing press-forming process steps by the production device. OF these drawings, FIG. 4A shows a state just before the start of press-forming, and FIG. 4B shows a state at a time of completion of forming. Note that FIG. 3A, FIG. 3B, FIG. 4A and FIG. 4B are limited to the continuous flange part 20 extending throughout a pair of two adjacent sides 12 in the external shape of the press-formed product 10 shown in FIG. 2, and show a configuration corresponding to the part by extracting the configuration, for convenience.

As shown in FIG. 3A, FIG. 3B, FIG. 4A and FIG. 4B, a production device 30 includes a punch 31 as a lower die, and includes a die 32 and a convex-shaped tool 33 as an upper die. Both of the die 32 and the convex-shaped tool 33 are paired with the punch 31. A top surface shape of the punch 31 is a shape substantially corresponding to the top plate part of the bulkhead which is an object to be produced.

In the die 32, a concave part which receives the punch 31 is engraved. The convex-shaped tool 33 is constructed integrally with the die 32, and is disposed in a position corresponding to the corner flange part of the bulkhead which is the object to be produced. That is, the convex-shaped tool 33 constitutes a part of the die 32. The convex-shaped tool 33 has a protruded part 33a. The protruded part 33a protrudes to a lower side facing the punch 31 from an undersurface of the die 32. By drive of a pressing machine, the die 32 and the convex-shaped tool 33 descend toward the punch 31. That is, the die 32 and the convex-shaped tool 33 move relatively to the punch 31.

The production device 30 may include a pad 34. The pad 34 is paired with the punch 31 as an upper die, and is disposed to face the punch 31. During press-forming, the pad 34 sandwiches a blank 36 between the pad 34 and the punch 31, and presses the blank 36. Thereby, an orientation of the blank 36 is stabilized during press-forming. The pad 34 is fitted to the die 32 by well-known common means.

In press-forming using the production device 30 of the configuration as above, edge parts 36a of the blank 36 of a steel plate are gradually folded by relative movement of the die 32 and the convex-shaped tool 33 to the punch 31. Then, the press-formed product 10 including a continuous flange part is produced, finally.

At the time of press-forming, by movement of the die 32 to the punch 31, the blank 36 is folded at portions corresponding to the sides of the top plate part, and side flange parts are formed. At this time, prior to the folding of the blank 36 by the die 32, the blank 36 is folded at a portion corresponding to the corner part of the top plate part by movement of the convex-shaped tool 33 to the punch 31, and the corner flange part 15 is formed.

Figure 5A:
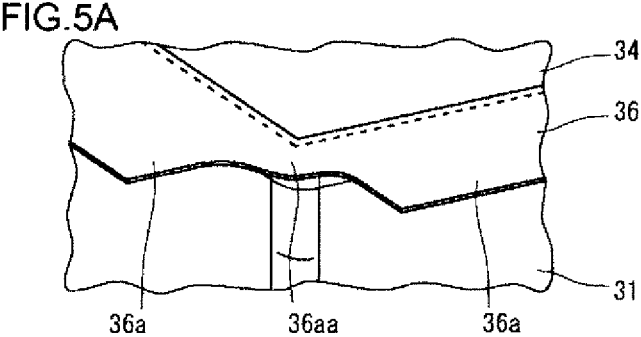
FIG. 5A is a perspective view showing a deformation process of a blank in a vicinity of a corner flange part, and shows a state before forming.
Figure 5B:
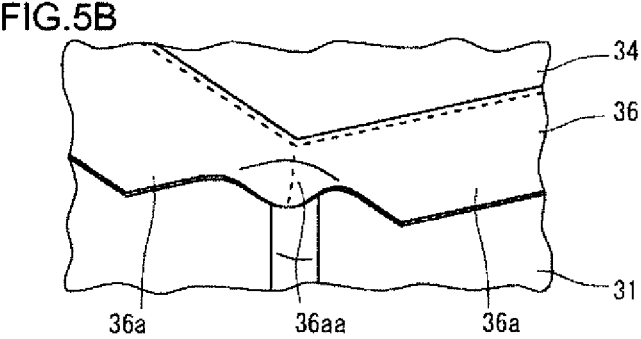
FIG. 5B is a perspective view showing a deformation process of the blank in the vicinity of the corner flange part, and shows a state of an initial stage of forming.
Figure 5C:
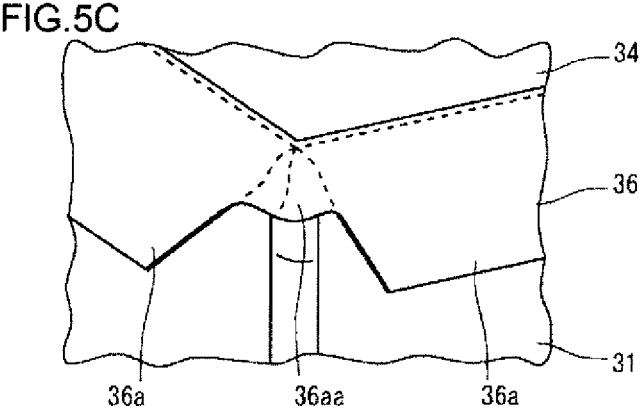
FIG. 5C is a perspective view showing a deformation process of the blank in the vicinity of the corner flange part, and shows a state of a middle stage of forming.
Figure 5D:
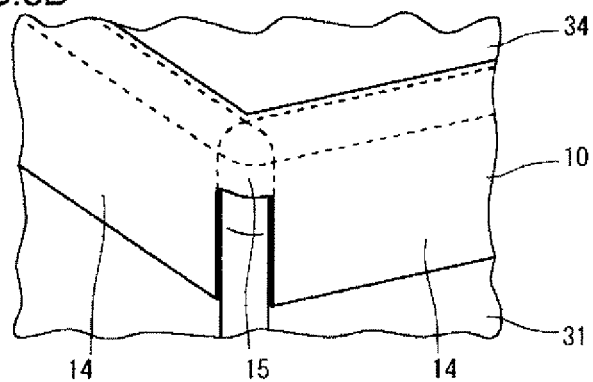
FIG. 5D is a perspective view showing a deformation process of the blank in the vicinity of the corner flange part, and shows a state at a time of completion of forming.

FIG. 5A to FIG. 5D are perspective views showing a deformation process of the blank in a vicinity of the corner flange part. Of these drawings, FIG. 5A shows a state before forming. FIG. 5B shows a state of an early stage of forming. FIG. 5C shows a state of a middle stage of forming. FIG. 5D shows a state at a time of completion of forming. FIG. 5A to FIG. 5D show an example including the pad 34, and omit illustration of the die and the convex-shaped tool for convenience.

At the time of press forming, the pad 34 contacts the blank 36 which is placed on the punch 31 first as shown in FIG. 5A, so that the blank 36 is sandwiched between the pad 34 and the punch 31. Thereby, the blank 36 is pressed. At this time, the blank 36 as well as a portion (hereinafter, a "portion to be a corner flange") 36aa that is planned to be formed into the corner flange part 15 (refer to FIG. 5D) is not deformed at all.

Next, as shown in FIG. 5B, the protruded part of the convex-shaped tool contacts at least a part of the portion 36aa planned to be a corner flange in the blank 36, and presses the portion 36aa planned to be a corner flange. Thereby, deformation of the blank 36 starts by being limited to the portion 36aa planned to be a corner flange, first. That is, folding of the blank 36 is started by the punch 31 and the convex-shaped tool, and with this, the corner flange part starts to be formed.

Subsequently, as shown in FIG. 5C, the die contacts the blank 36, and folding of the blank 36 by the punch 31 and the die starts. Thereby, the side flange parts start to be formed, subsequently to the start of forming of the corner flange part. Folding of the blank 36 by the convex-shaped tool and the die continues as it is. Then, as shown in FIG. 5D, the corner flange part 15 is formed by the punch 31 and the convex-shaped tool, and the side flange parts 14 are formed by the punch 31 and the die.

In this way, the press-formed product 10 including the continuous flange part can be produced while occurrence of wrinkles in the corner flange part 15 is suppressed. Hereinafter, a reason why occurrence of wrinkles is suppressed in the corner flange part 15 will be described.

By pressing at least a part of the portion 36aa planned to be a corner flange in advance by the convex-shaped tool (the protruded part in a strict sense), a deformation speed difference occurs between a domain which is pressed in advance and a domain, which is not pressed, around the domain that is pressed in advance. Consequently, as a deformation element of the portion 36aa planned to be a corner flange, an element of a shear deformation field is increased.

That is, by preceding forming by the convex-shaped tool, the deformation element of the corner flange part 15 changes from a conventional shrink flange deformation field (a strain ratio $\beta(\epsilon2/\epsilon1)<-1$: thickening) to the shear deformation field (a strain ratio $\beta(\epsilon2/\epsilon1)\approx-1$: no change in plate thickness). In accordance with this, excess thickness that occurs in the corner flange part 15 with folding by the die is pushed out to the side flange parts 14 and is dispersed in advance by the preceding forming by the convex-shaped tool. Thereby, occurrence of wrinkles in the corner flange part 15 and excessive increase in the plate thickness are effectively suppressed.

Pressing by the convex-shaped tool is preferably performed for a central position in the circumferential direction of the corner flange part 15. However, the pressing may be performed for a position which is somewhat deviated from the central position in the circumferential direction of the corner flange part 15.

Hereinafter, preferable dimension conditions of the convex-shaped tool will be shown.

As shown in FIG. 3B, a height h [mm] of the protruded part 33a provided in the convex-shaped tool 33 preferably satisfies a condition of Formula (2) as follows.

$$0.5 \times rf \leq h \leq 3.5 \times rf \quad (2)$$

In the Formula (2), rf indicates a radius [mm] of curvature of the corner flange part.

When the height h of the protruded part 33a becomes low to be less than "0.5×rf", an amount of preceding forming by the convex-shaped tool 33 becomes small. Consequently, the shear deformation field is not formed effectively in the corner flange part. As a result, an effect of suppressing generation of wrinkles and increase in plate thickness becomes small. Conversely, if the height h of the protruded part 33a becomes high to be more than "3.5×rf", a contact time period of the convex-shaped tool 33 and the blank becomes long. An area of the convex-shaped tool 33 is much smaller as compared with the die. Consequently, a damage to the convex-shaped tool 33 is likely to be caused.

A radius Rt [mm] of curvature of a front end (a front end of the convex-shaped tool 33) of the protruded part 33a preferably satisfies a condition of Formula (3) as follows.

$$Rt < rf \times \theta \quad (3)$$

In the Formula (3), rf indicates the radius [mm] of curvature of the corner flange part, and θ indicates an included angle [rad] of a pair of side flange parts connected by the corner flange part.

As described above, the convex-shaped tool 33 bears a role of pushing out the excess thickness that occurs in the corner flange part to the side flange parts by preceding forming compared with the die, and promoting the shear deformation field with no plate thickness increase. When the radius Rt of curvature of the front end of the protruded part 33a becomes large to be more than "rf×θ", a difference of the shapes of the convex-shaped tool 33 and the die becomes small. Consequently, an effect of suppressing occurrence of wrinkles and increase in plate thickness becomes small. Meanwhile, a lower limit of the radius Rt of curvature of the front end of the protruded part 33*a* is not specially limited. However, if the radius Rt of curvature of the front end of the protruded part 33*a* is too small, the front end of the protruded part 33*a* is easily damaged, and scratches can easily result on the corner flange part. Accordingly, the radius Rt of curvature of the front end of the protruded part 33*a* is preferably 1 mm or more.

As long as folding-forming by the convex-shaped tool precedes folding-forming by the die, the convex-shaped tool and the die may be constructed as separate bodies. In this case, after the convex-shaped tool is actuated, the die can be actuated later.

Further, although the above described production device has the configuration in which the punch is disposed as the lower die, and the die and the convex-shaped tool are disposed as the upper die, a configuration in which positions of the upper and lower dies are inverted vertically may be adopted.

[Press Forming of Second Embodiment]

Figure 6:
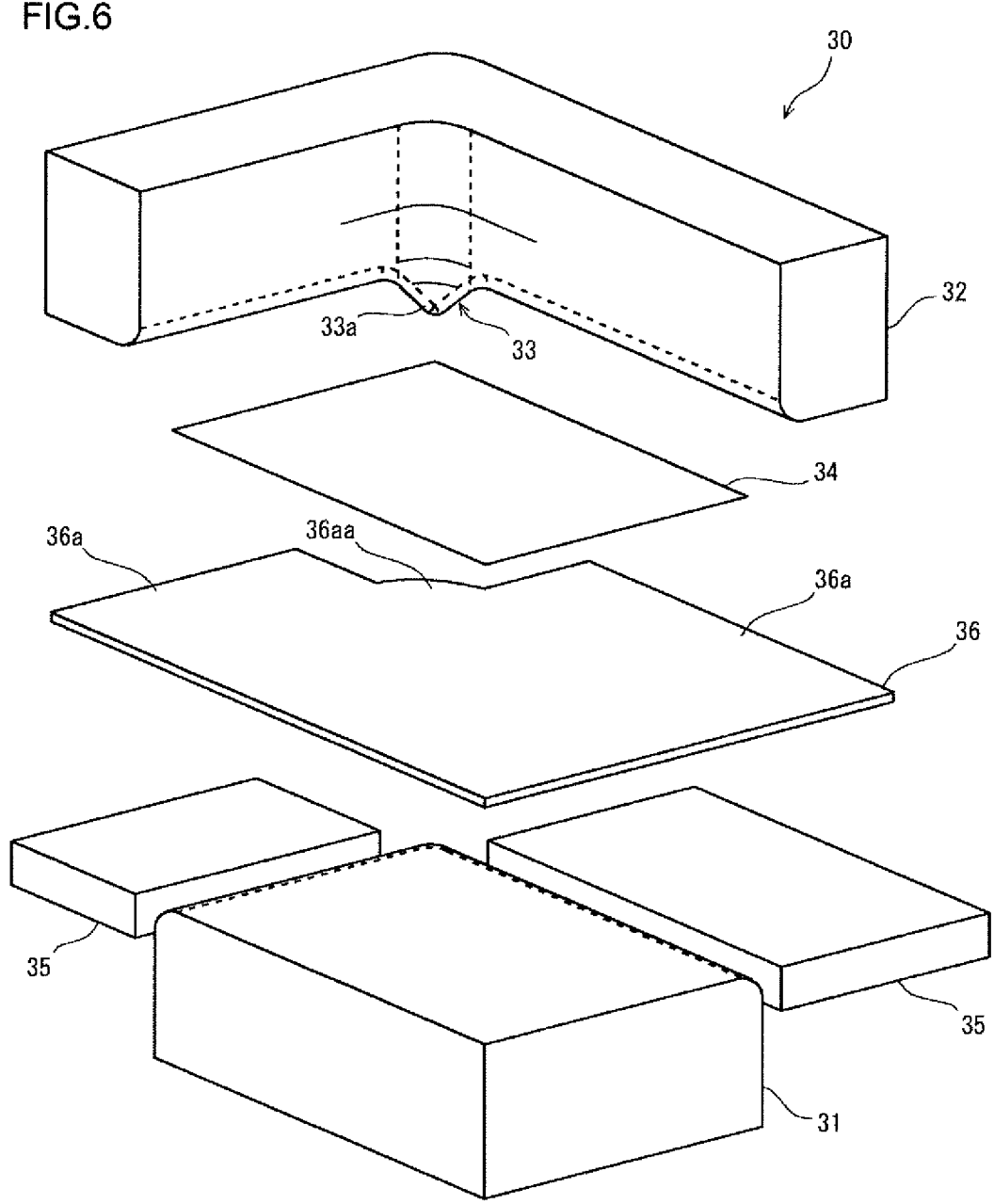
FIG. 6 is a perspective view schematically showing an entire configuration of a production device for a press-formed product according to a second embodiment.
Figure 7A:
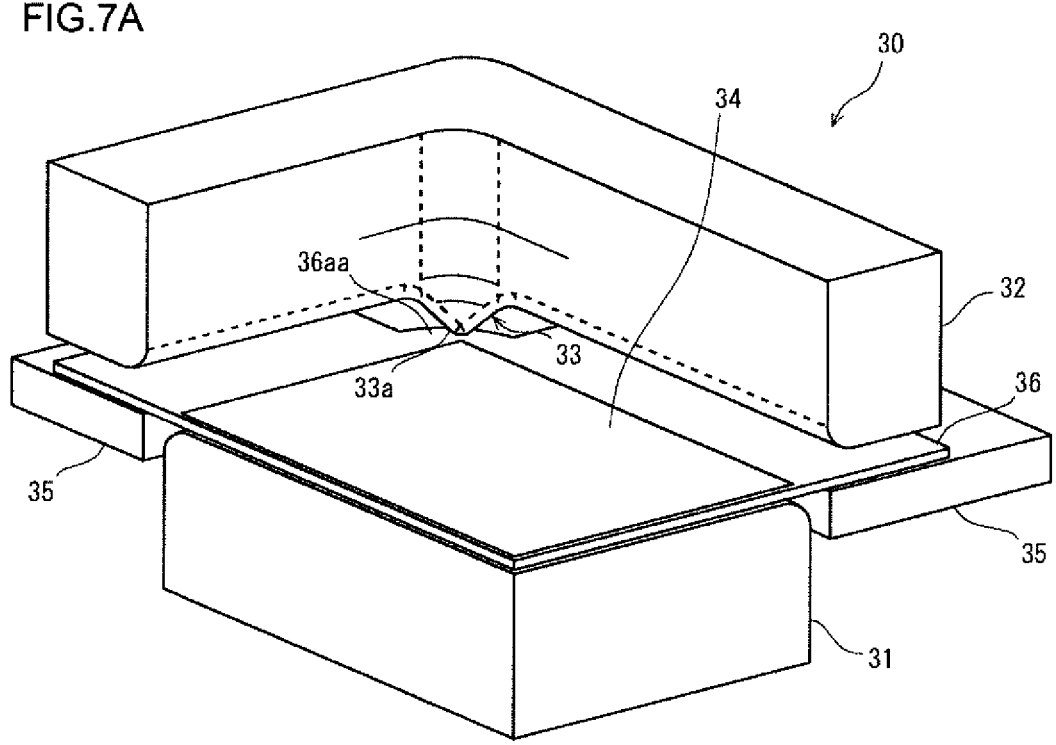
FIG. 7A is a perspective view showing a state just before the start of forming in press-forming by the production device of the second embodiment.
Figure 7B:
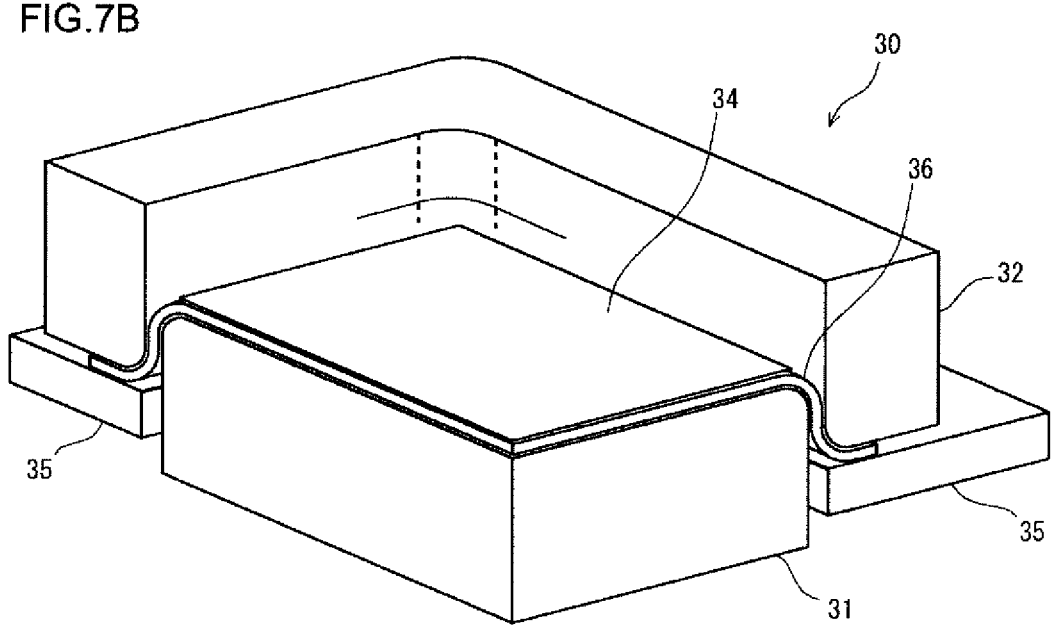
FIG. 7B is a perspective view showing a state under forming in the press-forming by the production device of the second embodiment.
Figure 7C:
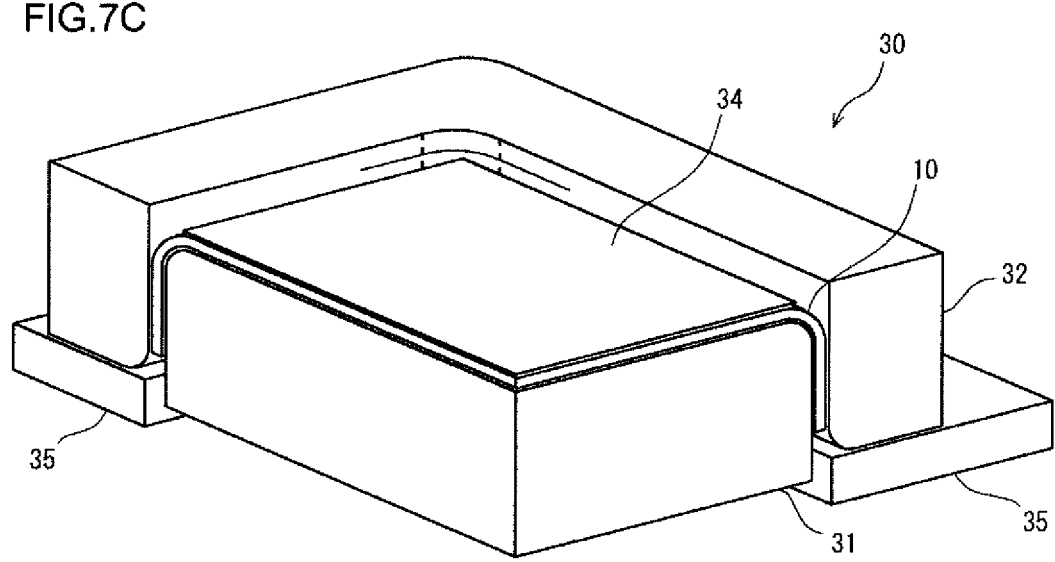
FIG. 7C is a perspective view showing a state at a time of completion of forming in the press-forming by the production device of the second embodiment.

FIG. 6 is a perspective view schematically showing an entire configuration of a production device of a press-formed product according to a second embodiment. FIG. 7A to FIG. 7C are perspective view showing press-forming process steps by the production device. Of these drawings, FIG. 7A shows a state just before the start of forming. FIG. 7B shows a state under forming, and FIG. 7C shows a state at a time of completion of forming. The production device 30 of the second embodiment is based on the configuration of the production device 30 of the aforementioned first embodiment.

As shown in FIG. 6, and FIG. 7A to FIG. 7C, the production device 30 of the second embodiment further includes a blank holder 35 as a lower die. The blank holder 35 is paired with the die 32 and is disposed to face the die 32. As shown in FIG. 7B, during press-forming, the blank holder 35 sandwiches the edge parts 36*a* (except for the portion 36*aa* planned to be a corner flange part) of the blank 36 between the blank holder 35 and the die 32, and presses the blank 36. Thereby, as compared with the first embodiment, abnormal out-of-plane deformation of the blank 36 is suppressed during press-forming.

EXAMPLES

In order to confirm the effect of the present invention, the following tests were carried out. As Inventive Example of the present invention, the bulkhead of the first example shown in FIG. 2A was produced by press-forming a steel plate. The bulkhead of the Inventive Example of the present invention has a continuous flange part throughout the entire outline of the top plate part. As Comparative Example, the conventional bulkhead shown in FIG. 1 was produced by press-forming a steel plate. The bulkhead of the Comparative Example does not have a corner flange part at all, and differs from the bulkhead of the Inventive Example of the present invention only in this point.

A plurality of cylindrical bodies simulating automobile structural members were prepared, and the bulkhead of the Inventive Example of the present invention and the bulkhead of the Comparative Example were each disposed in the central portions in the lengthwise directions inside the respective cylindrical bodies. Subsequently, the side flange parts were welded to the inner surfaces of cylindrical bodies by resistance spot welding, and these cylindrical bodies were presented as test pieces. The lengths of all the cylindrical bodies were 500 mm.

(1) Conditions of Inventive Example of Present Invention

Steel plate: the plate thickness is 1.4 mm, and the tensile strength is 590 MPa.

External dimensions of the bulkhead: the length of a side of the top plate part is 76 mm, the radius rf of curvature of the corner flange part is 12 mm, and the radius of curvature of the ridge line part is 4.4 mm.

Width of the side flange part: 15 mm

Width of the corner flange part: 15 mm

Position of spot welding: a pitch of approximately 35 mm in each of the side flange parts The bulkhead of the Inventive Example of the present invention was produced as follows. A blank in a predetermined shape was cut out from the steel plate having the plate thickness and the tensile strength described above. The blank was press-formed into the bulkhead with use of the production device of the aforementioned first embodiment. At this time, the height h of the protruded part of the convex-shaped tool was set at 15 mm. The radius Rt of curvature of the front end (the front end of the protruded part) of the convex-shaped tool was set at 3 mm. The radius R of curvature of the corner part of the die was set at 3 mm. A gap between the outer circumference of the punch and the inner circumference of the concave part of the die is set at the dimension corresponding to the plate thickness of the steel plate.

The plate thickness of the corner flange part of the obtained bulkhead was measured along the circumferential direction.

Figure 8:
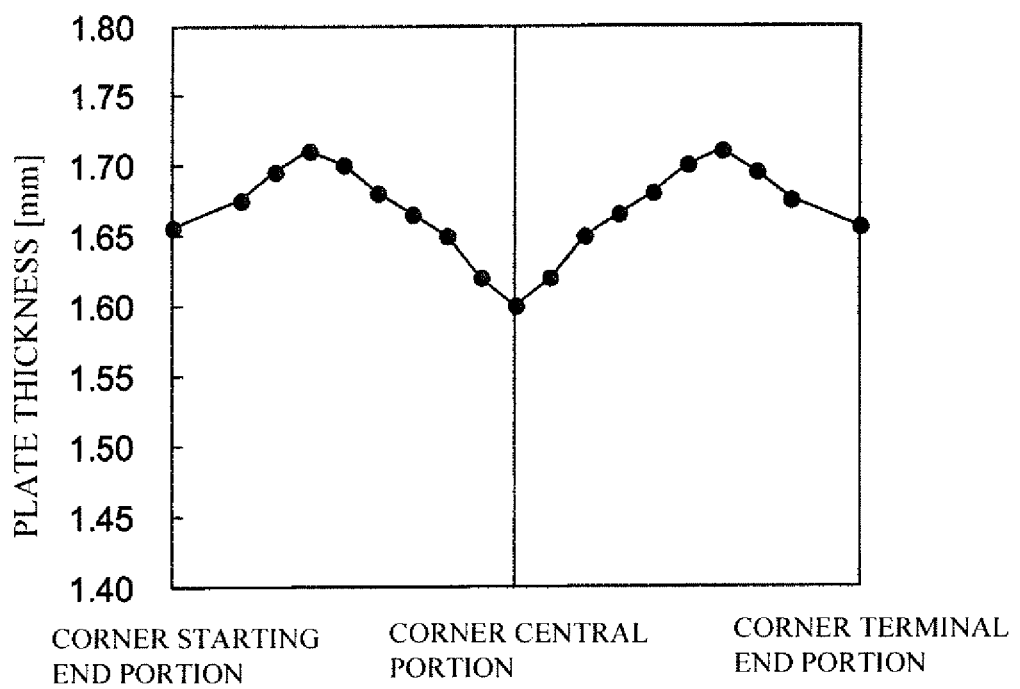
FIG. 8 is a diagram showing a distribution in a circumferential direction with respect to plate thickness of a corner flange part of a bulkhead of Inventive Example of the present invention.

FIG. 8 is a diagram showing a distribution in a circumferential direction with respect to the plate thickness of the corner flange part of the bulkhead of the Inventive Example of the present invention. As shown in FIG. 8, the plate thickness of the corner flange part was minimum in the central portion in the circumferential direction, and was maximum on both sides thereof. The maximum value was 1.71 mm, the minimum value was 1.60 mm, and the ratio of both values was approximately 1.1.

In the corner flange part of the bulkhead of the Inventive Example of the present invention as above, defective forming such as occurrence of wrinkles, and excessive increase in the plate thickness was not recognized. Further, a damage was not recognized on the surface of the convex-shaped tool which was used in the forming.

(2) Conditions of Comparative Example

The bulkhead of the Comparative Example was produced as follows. The bulkhead having no corner flange part in all the corner parts of the top plate part was produced by press-forming with use of the same steel plate as in Inventive Example of the present invention. As the blank at this time, the blank in which slits were made to domains corresponding to all the corner parts of the top plate part was used. The other conditions were set as the same as in Inventive Example of the present invention.

(3) Conditions of Cylindrical Body

Steel plate: the plate thickness is 0.7 mm, and the tensile strength is 590 MPa.

Internal dimensions: the length of a side is 76 mm, and the radius of curvature of the corner part is 12 mm.

That is, the external dimensions of the bulkhead of Inventive Example of the present invention corresponded to the internal dimensions of the cylindrical body. Consequently, in the Inventive Example of the present invention, there was no gap between the bulkhead and the cylindrical body. In contrast to this, the bulkhead of the Comparative Example was in the shape in which the corner parts of the top plate part were omitted, and no corner flange part was present. Consequently, in the Comparative Example, a gap was present partially (parts corresponding to the corner parts of the top plate part) between the bulkhead and the cylindrical body.

Three-point bending crush tests were carried out for these test pieces. Further, similar three-point bending crush tests were carried out for the individual cylindrical bodies.

Figure 9:
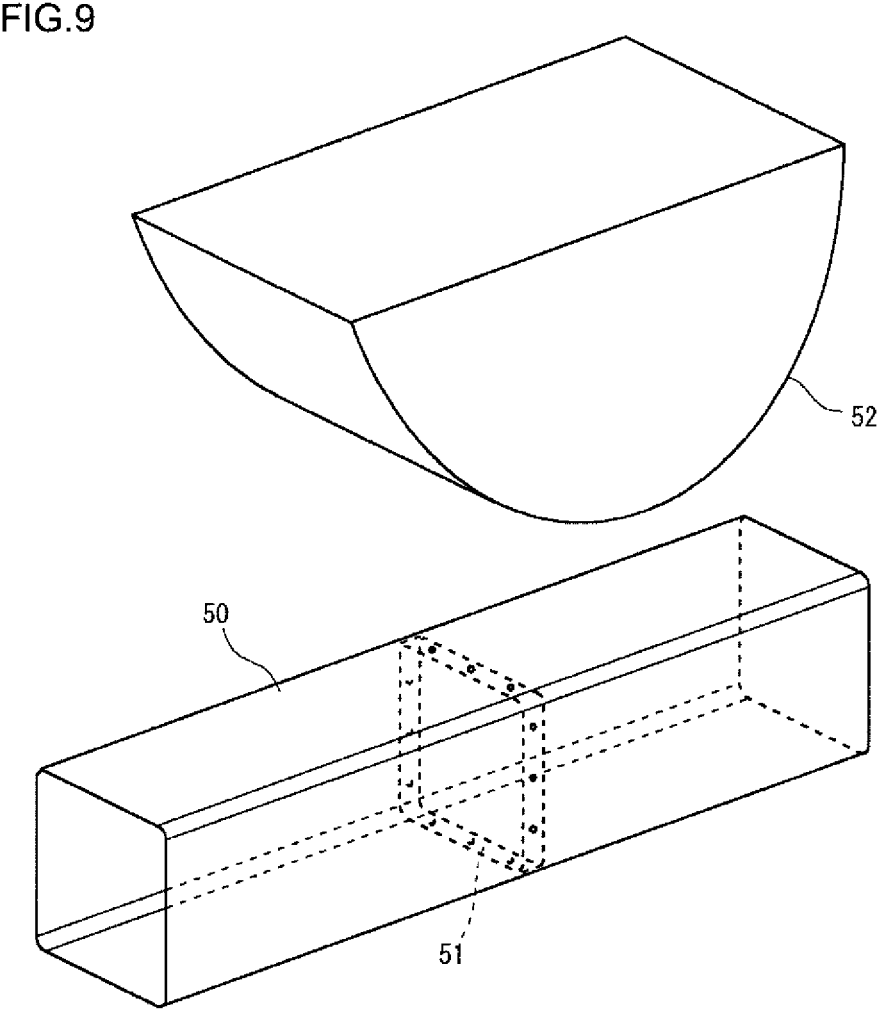
FIG. 9 is a perspective view schematically showing an outline of a three-point bending crush test.

FIG. 9 is a perspective view schematically showing an outline of the three-point bending crush test. FIG. 9 shows a test piece (a single cylindrical body and a cylindrical body including a bulkhead 51) 50 and a striker (an impactor) 52. In the test, both ends of the test piece 50 were arc-welded to a rigid plate (not illustrated), and the rigid plate is fixed onto a rigid base (not illustrated). In this state, the impactor 52 was collided to a central portion (that is, a fitting position for the bulkhead 51) in the lengthwise direction of the test piece 50. The collision speed of the impactor 52 was 64 km/h. At this time, the reaction force acting on the impactor 52 was measured until the entry amount of the impactor 52 into the test piece 50 reached 30 mm.

Figure 10:
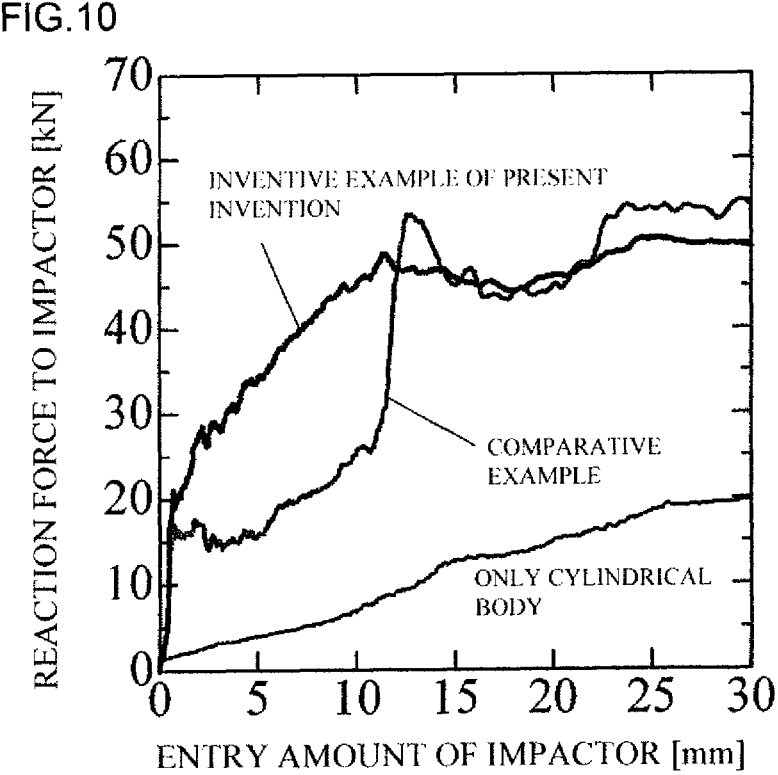
FIG. 10 is a diagram showing a relation between an entry amount of an impactor, and a reaction force to the impactor, as a test result of an example.

FIG. 10 is a diagram showing a relation of the entry amount of the impactor and the reaction force to the impactor, as the test result of the example. As shown in FIG. 10, in the Inventive Example of the present invention, the corner flange parts which connect the side flange parts are present, and the continuous flange part is formed, so that the sectional shape of the bulkhead and the cylindrical body are difficult to collapse. Consequently, in the initial stage (in particular, a range of the impactor entry amount of 0 to 10 mm) of collision, the wall surface of the cylindrical body is deformed in a wide range, and therefore, the reaction force to the impactor became remarkably higher than in the comparative example. This means that the collision absorbing energy of the cylindrical body of the Inventive Example of the present invention is higher than in the comparative example. Accordingly, it has become clear that the three-point bending crush performance of the structural member can be enhanced by the bulkhead including the continuous flange part.

It is needless to say that the present invention is not limited to the above described embodiments, and various changes can be made within the range without departing from the gist of the present invention.

REFERENCE SIGNS LIST

1: Automobile structural member (rocker),
10: Press-formed product (bulkhead),
11: Top plate part,
12: Side of top plate part,
13: Corner part of top plate part,
14: Side flange part,
15: Corner flange part,
16: Ridge line part,
17: Cutout,
20: Flange part,
30: Production device,
31: Punch,
32: Die,
33: Convex-shaped tool,
33a: Protruded part,
34: Pad,
35: Blank holder,
36: Blank,
36a: Edge part,
36aa: Portion planned to be corner flange

The invention claimed is:

1. A press-formed product formed from a steel plate, the press-formed product, comprising:
a top plate part; and
flange parts each extending from some or all of sides constituting an outline of the top plate part,
wherein a corner flange part extends from a corner part connecting, among the sides of the top plate part, at least a pair of the sides which are adjacent to each other and from which the flange parts extend,
the flange parts each extending from the pair of the sides are connected to each other via the corner flange part, and
in the corner flange part,
a central portion of the corner flange part has a minimum value of plate thickness in a direction along a circumferential direction of the corner part of the top plate part,
portions of the corner flange part on both sides of the central portion have a maximum value of the plate thickness, and
a ratio of the maximum value and the minimum value is in a range of more than 1.0 to 1.6 or less.

2. The press-formed product according to claim 1, wherein a radius of curvature of the corner flange part is 30 mm or less.

3. The press-formed product according to claim 1, wherein a width of at least a part of the flange parts is 10 mm or more.

4. The press-formed product according to claim 1, wherein tensile strength of the press-formed product is 440 MPa or more.

5. An automobile structural member that is a hollow structural member constituting an automobile body,
the automobile structural member comprising therein the press-formed product according to claim 1 as a reinforcing member, wherein
the flange parts are joined to the automobile structural member.

6. A production method for producing a press-formed product from a blank of a steel plate,
wherein the press-formed product comprises
a top plate part,
flange parts each extending from some or all of sides constituting an outline of the top plate part, and
a corner flange part extending from a corner part connecting, among the sides of the top plate part, at least a pair of the sides which are adjacent to each other and from which the flange parts extend, the corner flange part connecting the flange parts each extending from the pair of the sides, to each other,
the production method comprising:
using a punch, a die and a convex-shaped tool that is disposed in a position corresponding to the corner flange part, with both of the die and the convex-shaped tool being paired with the punch;
folding the blank by relative movement of the die to the punch, and thereby forming the flange parts; and
folding the blank prior to the folding of the blank by the die, by relative movement of the convex-shaped tool to the punch, and thereby forming the corner flange part.

7. The production method for a press-formed product according to claim 6,
wherein the convex-shaped tool is constructed integrally with or separately from the die.

8. The production method for a press-formed product according to claim 6,
the production method, further using a blank holder that is paired with the die, and
performing forming of the corner flange part and the flange parts in a state where the blank is sandwiched by the die and the blank holder.

9. A production device of producing a press-formed product from a blank of a steel plate,
wherein the press-formed product comprises
a top plate part,
flange parts each extending from some or all of sides constituting an outline of the top plate part, and
a corner flange part that is a corner flange part extending from a corner part connecting, among the sides of the top plate part, at least a pair of the sides which are adjacent to each other and from which the flange parts extend, the corner flange part connecting the flange parts each extending from the pair of the sides, to each other,
the production device comprising:
a punch; a die; and a convex-shaped tool that is disposed in a position corresponding to the corner flange part, with both of the die and the convex-shaped tool being paired with the punch,
wherein the die folds the blank by relative movement to the punch, and thereby forms the flange parts, and
the convex-shaped tool folds the blank prior to the folding of the blank by the die, by relative movement to the punch, and thereby forms the corner flange part.

10. The production device for a press-formed product according to claim 9,
wherein a radius Rt [mm] of curvature of a front end of the convex-shaped tool satisfies conditions of Formula (a) as follows:

$$Rt < rf \times \theta \qquad (a)$$

in the Formula (a), rf indicates a radius [mm] of curvature of the corner flange part, and θ indicates an included angle [rad] of the pair of the flange parts connected by the corner flange part.

11. The production device for a press-formed product according to claim 9,
wherein the convex-shaped tool is constructed integrally with or separately from the die.

12. The production device for a press-formed product according to claim 9, further comprising:
a blank holder that is disposed to face the die, and sandwiches the blank between the blank holder and the die.

* * * * *